(12) United States Patent
Tsai et al.

(10) Patent No.: US 6,853,771 B2
(45) Date of Patent: Feb. 8, 2005

(54) APPARATUS AND METHOD FOR COMPENSATION OF CENTRAL WAVELENGTH SHIFTING OF A FIBER GRATING

(76) Inventors: Hsi-Hsun Tsai, 14 Floor-1, No. 266, Wuling Rd., Hsinchu (TW); Ren-Jet Yao, No. 15, Lane 248, Chenggung Rd., Tsautuen Jen, Nantou (TW); I-Han Wu, No. 8, Lane 164, Fenghuang Rd., Dali City, Taichung (TW); Winyann Jang, No. 7, Alley 19, Lane 131, Anhe Rd., Shituen Chiu, Taichung (TW)

(*) Notice: Subject to any disclaimer, the term of this patent is extended or adjusted under 35 U.S.C. 154(b) by 76 days.

(21) Appl. No.: 10/294,127

(22) Filed: Nov. 13, 2002

(65) Prior Publication Data

US 2003/0091285 A1 May 15, 2003

(30) Foreign Application Priority Data

Nov. 14, 2001 (TW) .................................. 90128216 A

(51) Int. Cl.$^7$ ................................................ G02B 6/34
(52) U.S. Cl. ............................................................ 385/37
(58) Field of Search ............................................. 385/37

(56) References Cited

U.S. PATENT DOCUMENTS

| | | | | |
|---|---|---|---|---|
| 5,694,503 A | * | 12/1997 | Fleming et al. ............... | 385/37 |
| 6,067,392 A | * | 5/2000 | Wakami et al. ................ | 385/37 |
| 6,148,128 A | * | 11/2000 | Jin et al. ........................ | 385/37 |
| 6,327,405 B1 | * | 12/2001 | Leyva et al. ................... | 385/37 |
| 6,400,884 B1 | * | 6/2002 | Matano et al. ............... | 385/137 |
| 6,449,402 B1 | * | 9/2002 | Bettman et al. ............... | 385/15 |
| 6,493,486 B1 | * | 12/2002 | Chen ............................ | 385/37 |
| 6,603,900 B1 | * | 8/2003 | Bookbinder et al. .......... | 385/37 |
| 2002/0003927 A1 | * | 1/2002 | Tamura et al. ................ | 385/37 |

* cited by examiner

*Primary Examiner*—Mark Tremblay
(74) *Attorney, Agent, or Firm*—Troxell Law Office PLLC

(57) ABSTRACT

An apparatus and method for compensation of central wavelength shifting of a fiber grating by material with Invar effect. In the present invention, a substrate having a negative thermal expansion coefficient and a fiber with fiber grating is provided, and two portions of the fiber at both sides of the fiber grating are fixed to the substrate. The substrate and the fiber are satisfied with $$\alpha_{eff}\lambda_{bragg} = K_\lambda A_f E_f(\alpha_c - \alpha_f)$$

in which $\alpha_{eff}$ is an effective thermal expansion coefficient of the fiber grating, $\lambda_{bragg}$ is a Bragg wavelength, $K_\lambda$ is a constant, $A_f$ is a cross-section area of the fiber, $E_f$ is an elastic modulus of the fiber, $\alpha_c$ is the negative thermal expansion coefficient of the substrate, and $\alpha_f$ is a thermal expansion coefficient of the fiber.

3 Claims, 7 Drawing Sheets

APPARATUS AND METHOD FOR COMPENSATION OF CENTRAL WAVELENGTH SHIFTING OF A FIBER GRATING

BACKGROUND OF THE INVENTION

1. Field of the Invention

The present invention relates to an apparatus and method for compensation of central wavelength shifting of a fiber grating by a substrate with Invar effect.

2. Description of the Related Art

In an optical fiber based communication system, there is a trend toward application of fiber grating. The fiber grating has a plurality of physical properties, such as sharp reflection angle, suited to application of multiplex wave dividing devices, de-multiplexers, laser source stabilization devices and chirped gratings.

It is required for the fiber grating to provide an output wavelength reliably and stably in a range of ambient temperature from −40° C. to 80° C. For example, for an uncompensated fiber grating in which a laser beam having a 1550-nanometer wavelength is applied, a central wavelength change of the fiber grating is 1 nanometer when the ambient temperature increases from −40° C. to 80° C. Since high quality multiplex wave dividing devices may have a sophisticated transmission wave channel of 0.8 nanometers, wave channel stabilization for the fiber grating is required to prevent wave channel variation, or errors can occur in the optical fiber transmission.

However, in most reliable conventional compensation mechanism, the central wavelength of the fiber grating is fixed. One conventional compensation mechanism introduces a ceramic substrate with negative thermal expansion coefficient, made of $ZrV_2O_7$, $ZrW_2O_8$, $Sc_2(WO_4)_3$ or $HfW_2O_8$. Manufacture of the ceramic substrate of $ZrW_2O_8$ is described in U.S. Pat. No. 6,258,743 to Fleming et al. (2001), U.S. Pat. No. 5,322,559 to Sleight et al. (1994), U.S. Pat. No. 5,433,778 to Sleight et al. (1995), and U.S. Pat. No. 5,514,360 to Sleight et al. (1996). Manufacture of the ceramic substrate of $LiAlSi_2O_6$ is described in U.S. Pat. No. 6,066,585 to Swartz (2000). Materials of $ZrW_2O_8$ and $ZrV_2O_7$ is described in Alexander et al. (1996), and materials of $ZrW_2O_8$, $Sc_2(WO_4)_3$ or $HfW_2O_8$ are described in Evans (1996, 1997).

Further, an application of the ceramic substrate with negative thermal expansion coefficient for compensation of the central wavelength of the fiber grating is disclosed in U.S. Pat. No. 6,081,641 to Chen (2000), which relates to a structure and method to compensate for temperature changes on wavelength shifting in DWDM. The DWDM is connected to substrates of different thermal expansion coefficients, such that the fused-fiber portion of the DWDM exhibits negative thermal expansion. As a result, temperature-induced wavelength shifts are minimized due to passive thermal compensation, which can be easily adjusted.

Another application of the ceramic substrate with negative thermal expansion coefficient for compensation of the central wavelength of the fiber grating is disclosed in U.S. Pat. No. 6,209,352 to Beall et al., which relates to an athernal optical device and a method for producing the device. In Beall et al., the athermal optical fiber reflective grating device has a negative expansion substrate of glass-ceramic, an optical fiber mounted on the substrate surface, and a grating defined in the optical fiber. However, the glass-ceramic applied in Beall et al. is not limiting.

In the above-mentioned prior arts, metalloid-based ceramic materials with negative thermal expansion coefficients are used as the substrate of the fiber grating to compensate for the central wavelength shifting. However, there are some metal-based materials with negative thermal expansion coefficients.

Generally, a heated body in solid state expands. In order to reduce the thermal expansion coefficients of the body in a predetermined range of temperature to zero or even a negative value, which refers to the "Invar effect", a thermal shrink effect of the body is applied. The thermal shrink effect is generally a magnetic effect in solid state. Presently, the well-known iron/steel materials with negative thermal expansion coefficients include 35Ni-65Fe, 32Ni-64Fe-4Co, 37Fe-32Co-11Cr, and the noncrystalline alloy 83Fe-17B. The alloy with a zero or negative thermal expansion coefficient is an Invar alloy.

SUMMARY OF THE INVENTION

In view of this, it is an object of the present invention to use the above-mentioned Invar alloy as the substrate in order to perform compensation of central wavelength shifting of the fiber grating.

The present invention discloses an apparatus and method for compensation of central wavelength shifting of a fiber grating by a substrate with Invar effect. In the present invention, a substrate having a negative thermal expansion coefficient and a fiber with fiber grating is provided, and two portions of the fiber at both sides of the fiber grating are fixed to the substrate. The substrate and the fiber are satisfied with $$\alpha_{\mathit{eff}} \lambda_{\mathit{bragg}} = K_\lambda A_f E_f (\alpha_c - \alpha_f)$$

in which $\alpha_{\mathit{eff}}$ is an effective thermal expansion coefficient of the fiber grating, $\lambda_{\mathit{Bragg}}$ is a Bragg wavelength, $K_\lambda$ is a constant, $A_f$ is a cross-section area of the fiber, $E_f$ is an elastic modulus of the fiber, $\alpha_c$ is the negative thermal expansion coefficient of the substrate, and $\alpha_f$ is a thermal expansion coefficient of the fiber.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
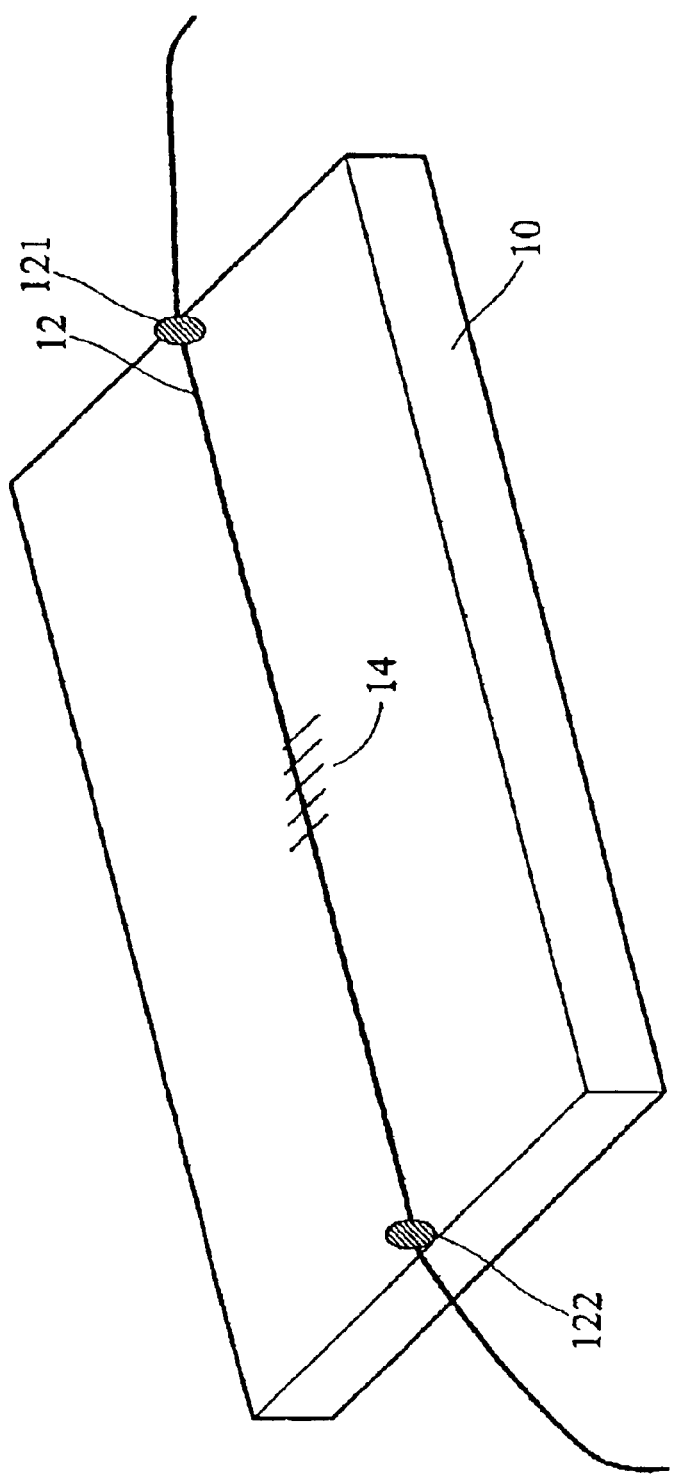
FIG. 1 is a schematic view showing the apparatus for compensation of central wavelength shifting of a fiber grating by a substrate with Invar effect of the present invention.
Figure 2:
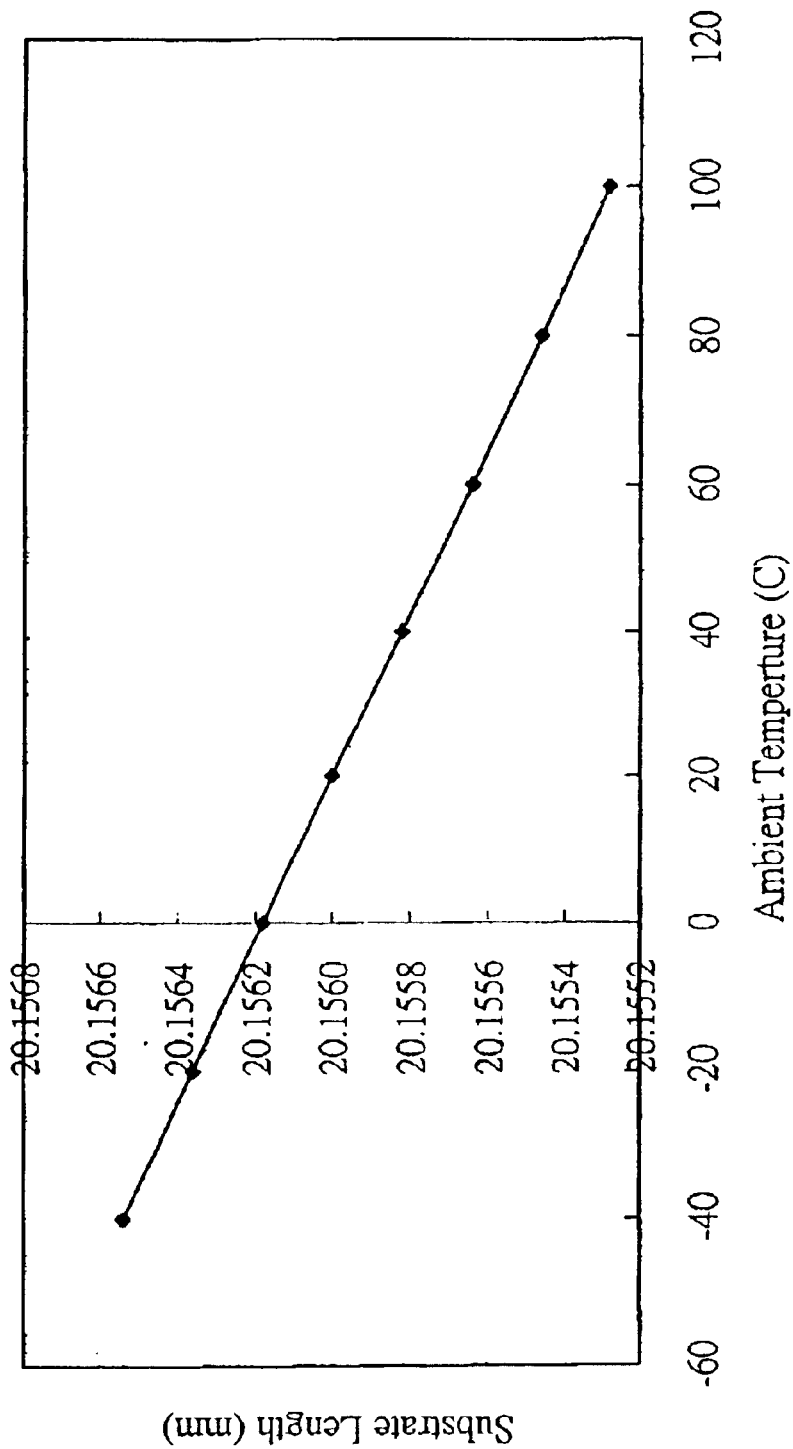
FIG. 2 is a diagram showing the relationship of length of the substrate with Invar effect to the ambient temperature of the present invention.

FIG. 1 shows an embodiment of the apparatus for compensation of central wavelength shifting of a fiber grating by a substrate with Invar effect of the present invention. In FIG. 1, the fiber 12 is provided with fiber grating 14, and the two portions (that is, a first portion and a second portion) 121, 122 at both sides of the fiber grating 14 are fixed on the compensated substrate (Invar alloy) 10. When an ambient temperature change $\Delta T$ occurs, the compensated substrate shrinkage is:

$$\Delta L = L \alpha_c \Delta T \quad (1)$$

where L is the initial length of the compensated substrate 10, and $\alpha_c$ is the thermal expansion coefficient of the compensated substrate 10. The relationship of length of the compensated substrate 10 to the ambient temperature is shown in FIG. 2.

Figure 3:
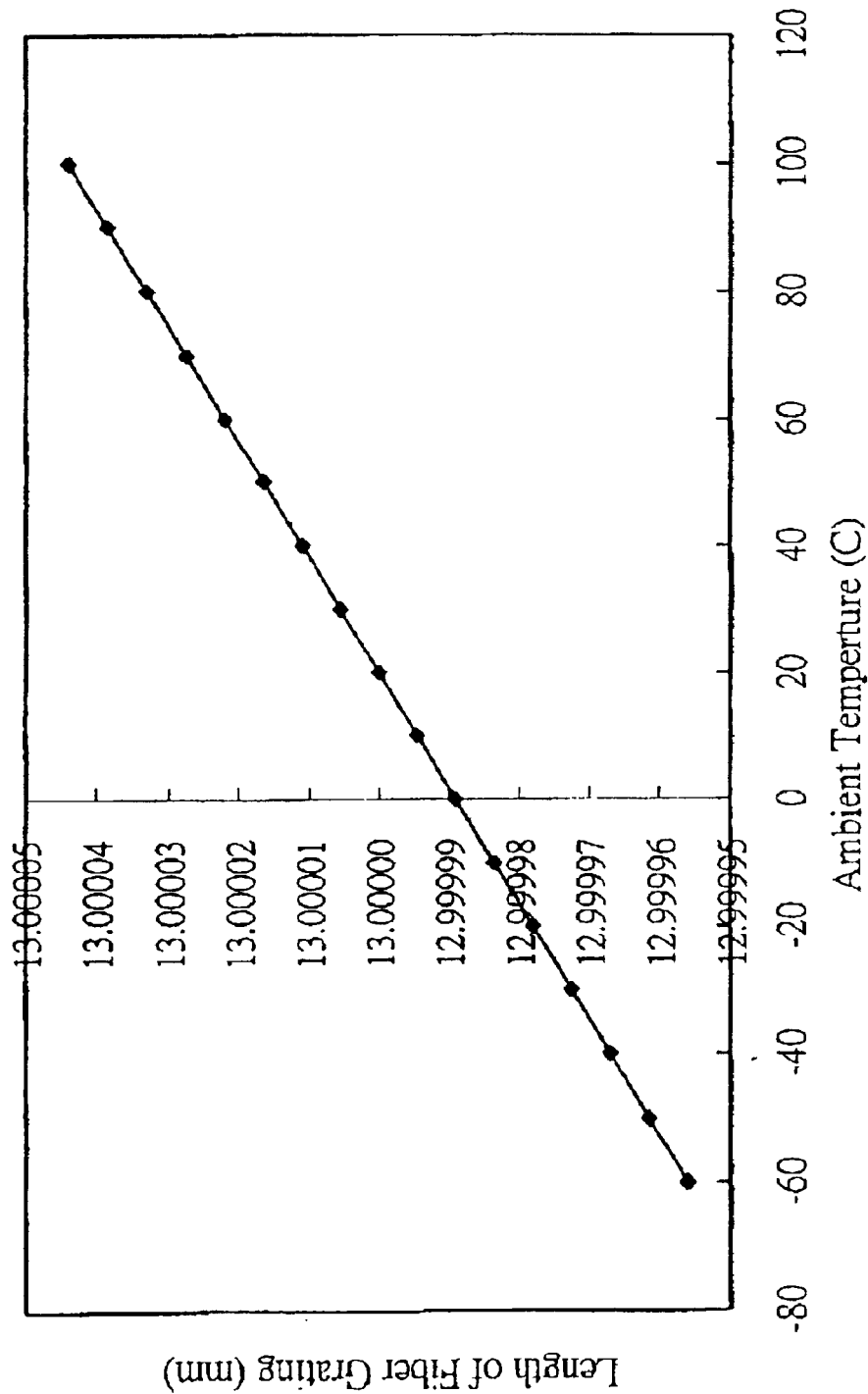
FIG. 3 is a diagram showing the relationship of length of the fiber grating of the present invention to the ambient temperature.

It should be noted that both the compensated substrate shrinkage and the fiber grating expansion reduce the tension force of the fiber grating 14. The relationship of length of the fiber grating 14 to the ambient temperature is shown in FIG. 3. The tension force change is expressed as:

$$\Delta P_f = -\frac{A_f E_f (\alpha_f L_f \Delta T - \Delta L)}{L_f} \quad (2)$$

where $\alpha_f$ is the thermal expansion coefficient of the fiber 12, $L_f$ is the initial length of the fiber 12, $A_f$ is the cross-section area of the fiber 12, and $E_f$ is the elastic modulus of the fiber 12.

Figure 5:
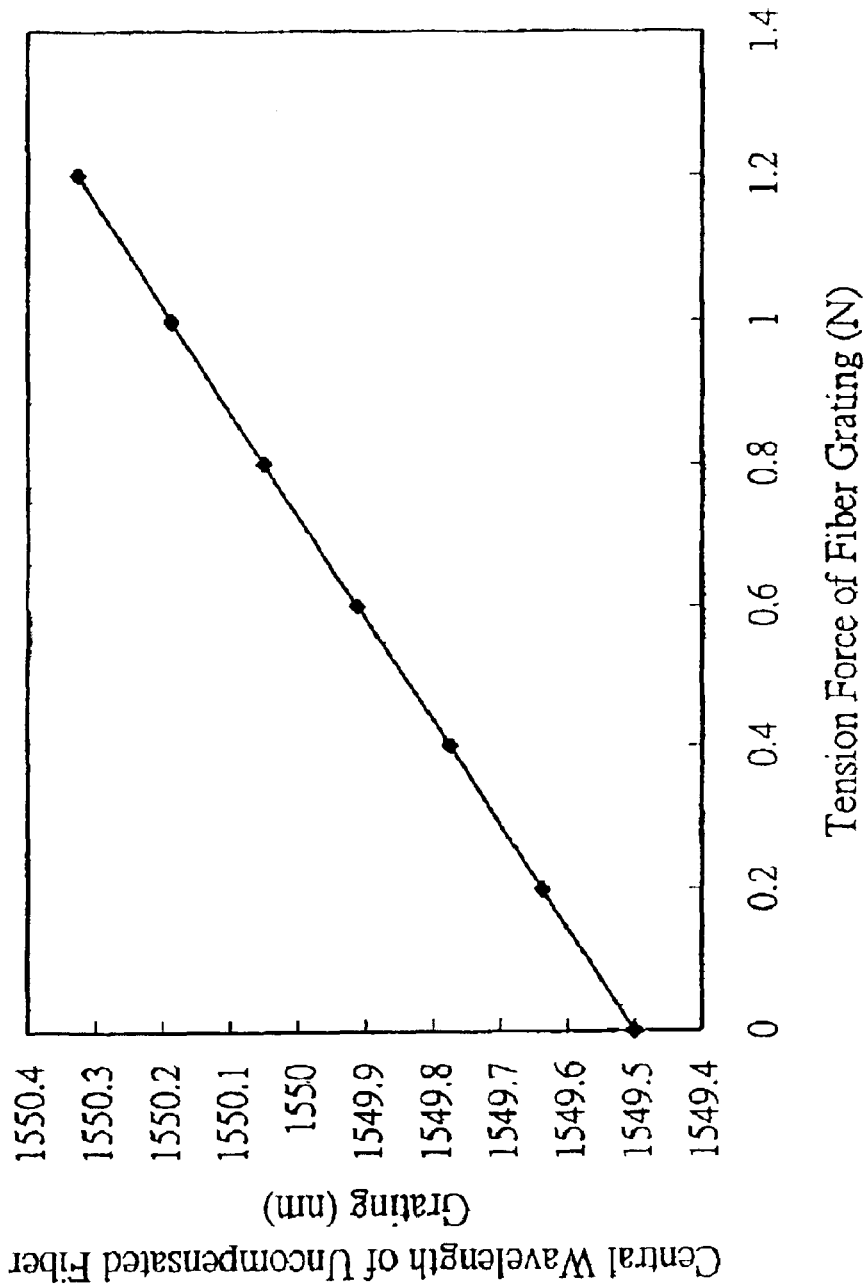
FIG. 5 is a diagram showing the relationship of the central wavelength and the tension force of the uncompensated fiber grating of the present invention.

Further, the central wavelength is in a direct proportional relation to the tension force of the fiber grating 14, as shown in FIG. 5. This relation is expressed as:

$$\Delta \lambda_{\Delta P} K_\lambda \Delta P_f \quad (3)$$

where $\Delta \lambda_{\Delta P}$ is the central wavelength change of the fiber grating 14 due to the tension force, and $K_\lambda$ is a constant, which can be obtained by experiments.

Introducing Equations (1) and (2) to Equation (3), an alternative form of the central wavelength change of the fiber grating 14 is obtained as:

$$\Delta \lambda_{\Delta P} = K_\lambda \frac{A_f E_f [\alpha_f L_f \Delta T - L \alpha_c \Delta T]}{L_f} = \frac{K_\lambda A_f E_f \Delta T (\alpha_f L_f - L \alpha_c)}{L_f} \quad (4)$$

Figure 4:
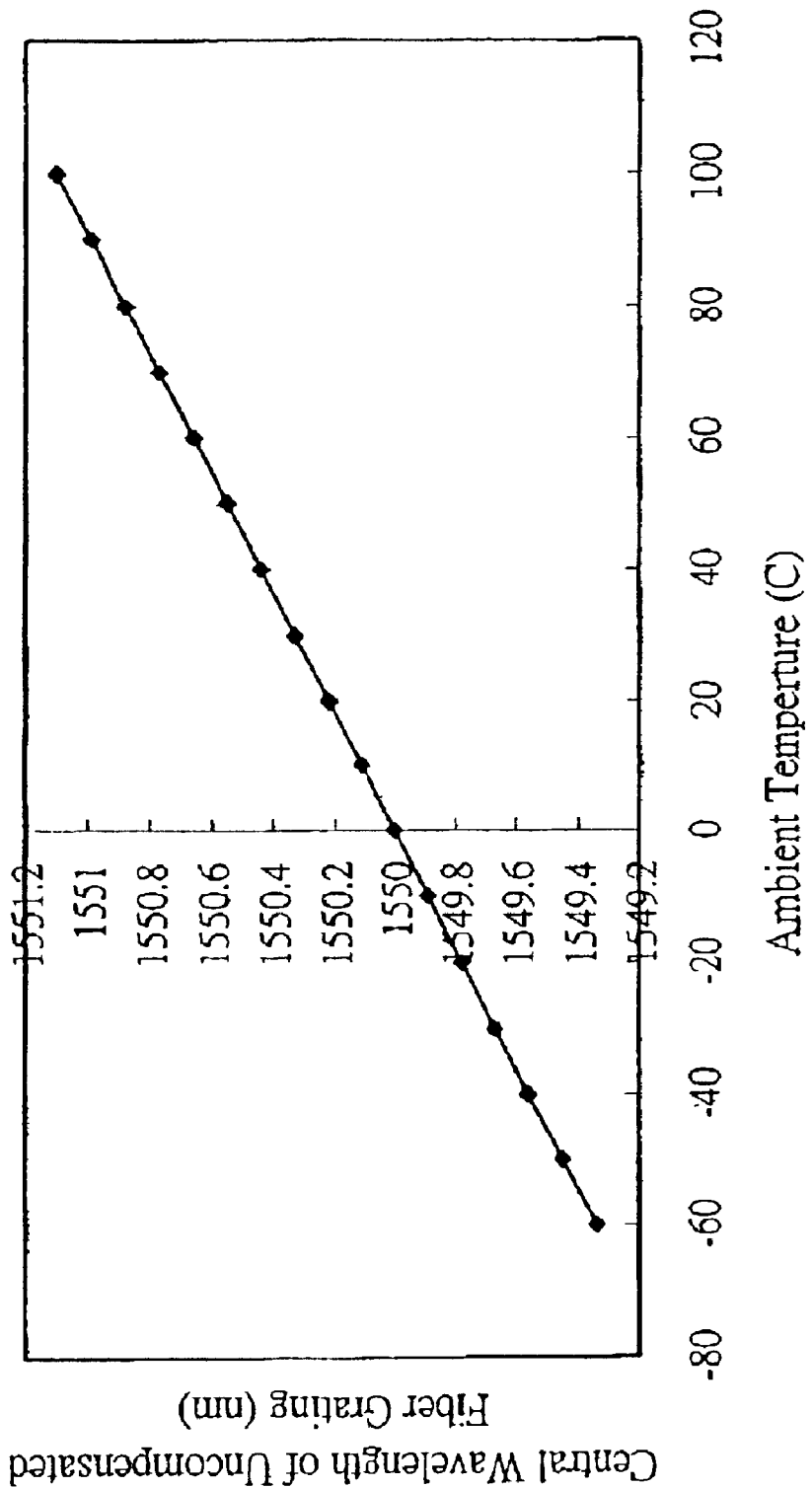
FIG. 4 is a diagram showing the relationship of length of the uncompensated fiber grating to the ambient temperature of the present invention.

Further, the central wavelength of the fiber grating 14 is also in a relation to the ambient temperature change, as shown in FIG. 4. This relation is expressed as:

$$\frac{\Delta \lambda_{\Delta T}}{\Delta T} = \alpha_{eff} \lambda_{Bragg} \quad (5)$$

where $\Delta \lambda_{\Delta T}$ is the central wavelength change of the fiber grating 14 due to the ambient temperature change, and $\lambda_{Bragg}$ is the Bragg wavelength.

In order to keep the central wavelength of the fiber grating 14 from changing due to the ambient temperature change, the Bragg wavelength should be fixed. That is, $$\frac{\Delta \lambda_{Bragg}}{\Delta T} = \frac{\Delta \lambda_{\Delta T}}{\Delta T} + \frac{\Delta \lambda_{\Delta P}}{\Delta T} = 0 \quad (6)$$

Figure 6:
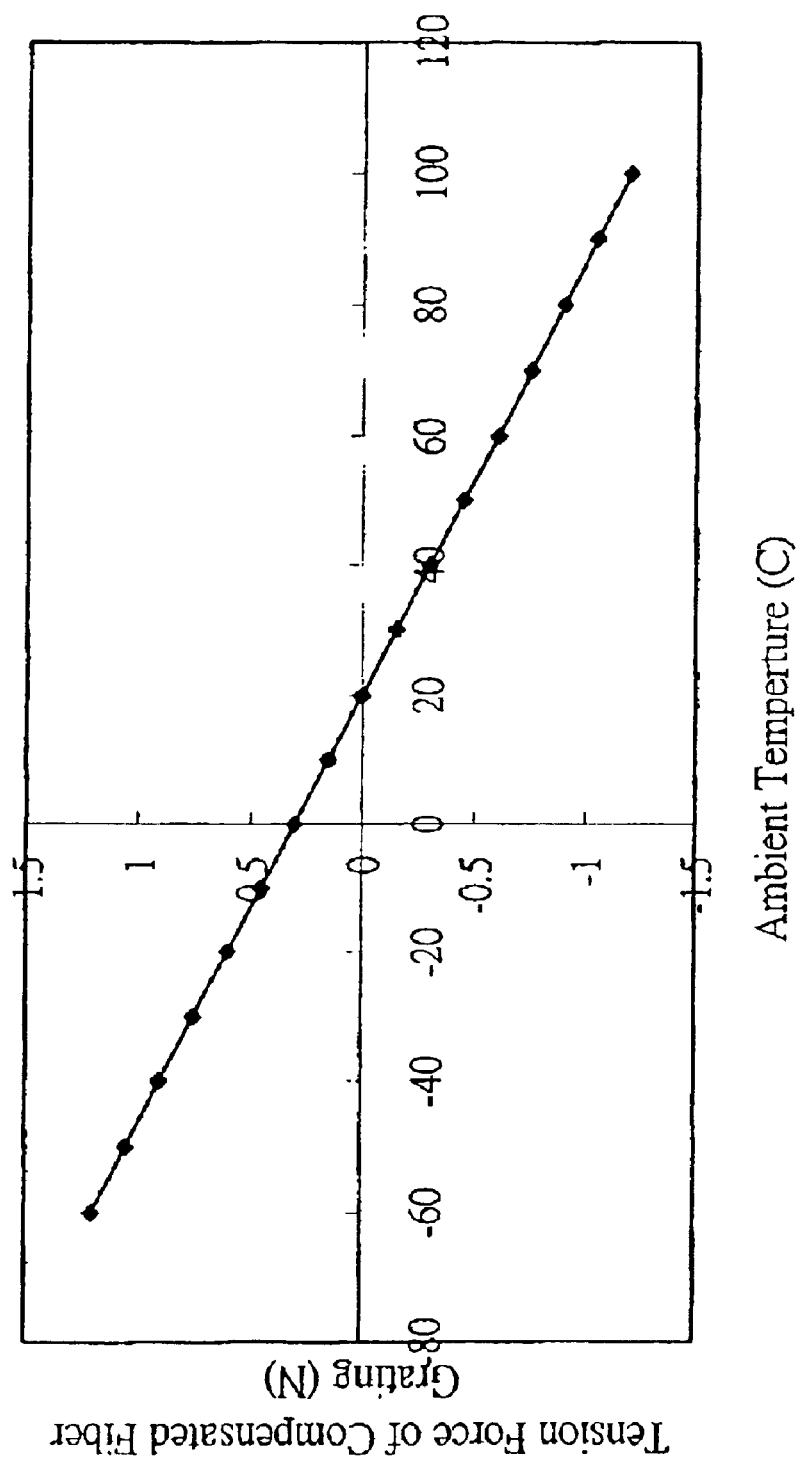
FIG. 6 is a diagram showing the relationship of the tension force of the compensated fiber grating to the ambient temperature of the present invention.

It is shown in Equation (6) that the tension force of the compensated fiber grating 14 reduces when the ambient temperature increases, as shown in FIG. 6.

Figure 7:
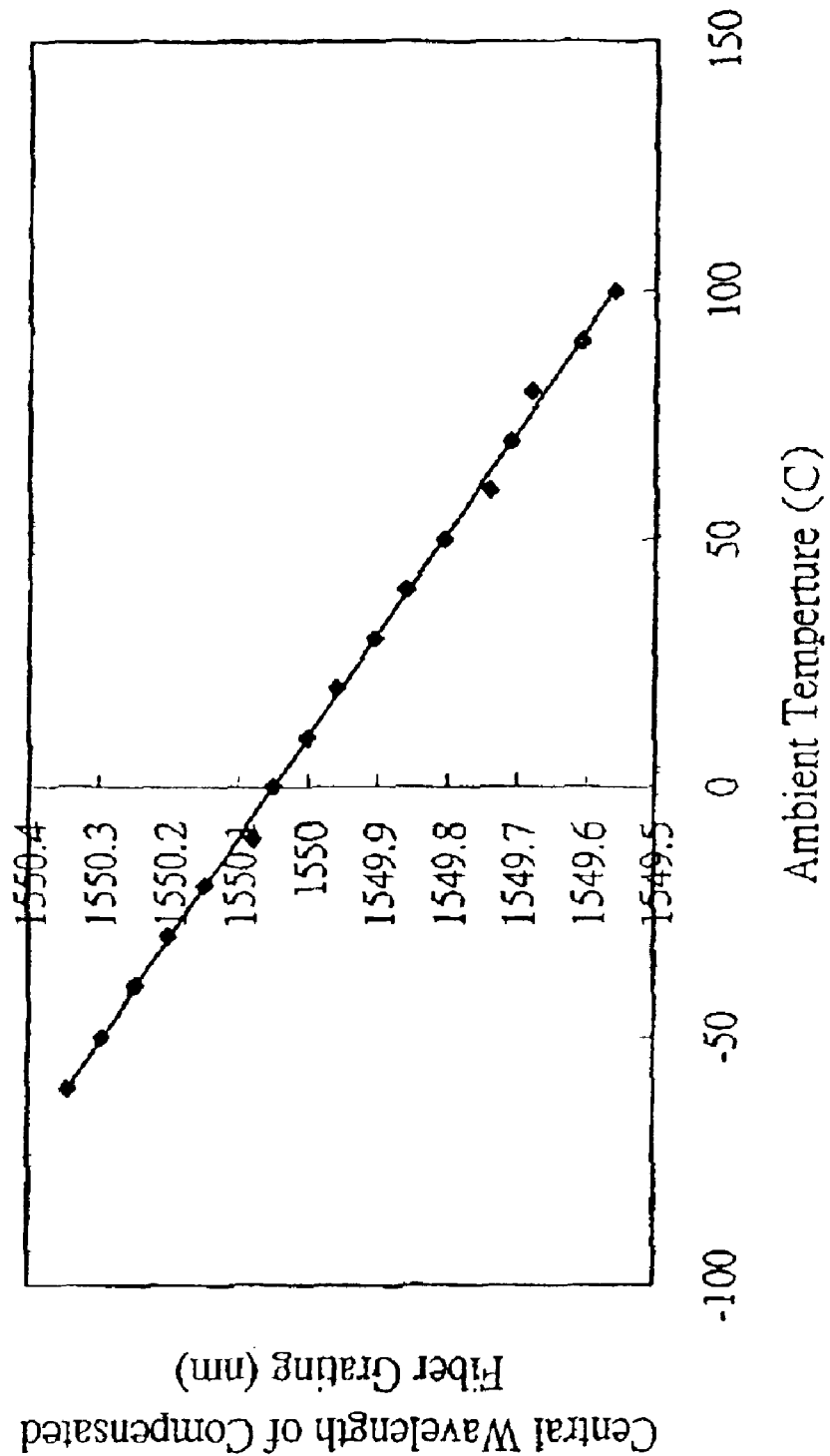
FIG. 7 is a diagram showing the relationship of the central wavelength of the compensated fiber grating to the ambient temperature of the present invention.

With Equations (4) and (5), Equation (6) can be modified to a temperature compensation equation as shown in FIG. 7. The temperature compensation equation is expressed as:

$$\alpha_{eff} \lambda_{bragg} = K_\lambda A_f E_f (\alpha_c - \alpha_f) \quad (7)$$

When the material characteristics and the dimensional parameter of the fiber grating 14 conform to Equation (7), the fiber grating 14 is in a complete temperature compensated status. If and only if the substrate length satisfies with Equation (7), a complete temperature compensation with zero central wavelength shifting is obtained.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An apparatus and method for compensation of central wavelength shifting of a fiber grating by material with Invar effect, comprising:
   a substrate having a negative thermal expansion coefficient; and
   a fiber having a first portion and a second portion fixed on the substrate and a third portion located between the first portion and the second portion, the third portion having the fiber grating;
   the substrate and the fiber having a temperature compensation equation expressed as:

$$\alpha_{eff} \lambda_{bragg} = K_\lambda A_f E_f (\alpha_c - \alpha_f)$$

wherein:
   $\alpha_{eff}$ is an effective thermal expansion coefficient of the fiber grating;
   $\alpha_{bragg}$ is a Bragg wavelength;
   $K_\lambda$ is a constant;
   $A_f$ is a cross-section area of the fiber;
   $E_f$ is an elastic modulus of the fiber;
   $\alpha_c$ is the negative thermal expansion coefficient of the substrate; and
   $\alpha_f$ is a thermal expansion coefficient of the fiber.

2. The apparatus according to claim 1, wherein the substrate is formed with a Invar alloy.

3. A method for compensation of central wavelength shifting of a fiber grating by material with Invar effect, comprising the steps of:
   a) providing a substrate having a negative thermal expansion coefficient and a fiber with a fiber grating, the substrate and the fiber having a temperature compensation equation expressed as:

$$\alpha_{eff} \lambda_{bragg} = K_\lambda A_f E_f (\alpha_c - \alpha_f)$$

wherein:

$\alpha_{eff}$ is an effective thermal expansion coefficient of the fiber grating;

$\lambda_{bragg}$ is a Bragg wavelength;

$K_\lambda$ is a constant;

$A_f$ is a cross-section area of the fiber;

$E_f$ is an elastic modulus of the fiber;

$\alpha_c$ is the negative thermal expansion coefficient of the substrate; and $\alpha_f$ is a thermal expansion coefficient of the fiber, and;

b) fixing a first portion and a second portion of the fiber to the substrate, wherein the fiber grating is positioned between the first portion and the second portion.

* * * * *